United States Patent
Terada et al.

(10) Patent No.: US 9,741,992 B2
(45) Date of Patent: Aug. 22, 2017

(54) BUS BAR MODULE

(71) Applicant: TOYOTA JIDOSHA KABUSHIKI KAISHA, Toyota-shi, Aichi-ken (JP)

(72) Inventors: Yasuharu Terada, Toyota (JP); Norio Nishiwaki, Tajimi (JP); Takayoshi Amano, Toyokawa (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 143 days.

(21) Appl. No.: 14/628,340

(22) Filed: Feb. 23, 2015

(65) Prior Publication Data

US 2015/0243954 A1    Aug. 27, 2015

(30) Foreign Application Priority Data

Feb. 25, 2014    (JP) ................. 2014-033716

(51) Int. Cl.

| | |
|---|---|
| H01M 2/30 | (2006.01) |
| H01M 10/48 | (2006.01) |
| H01M 10/42 | (2006.01) |
| H01M 2/26 | (2006.01) |
| H01M 2/10 | (2006.01) |
| H01M 2/20 | (2006.01) |
| H01G 9/012 | (2006.01) |

(52) U.S. Cl.
CPC ............. *H01M 2/26* (2013.01); *H01G 9/012* (2013.01); *H01M 2/1077* (2013.01); *H01M 2/206* (2013.01); *H01M 2/30* (2013.01); *H01M 10/425* (2013.01); *H01M 10/482* (2013.01)

(58) Field of Classification Search
None
See application file for complete search history.

(56) References Cited

U.S. PATENT DOCUMENTS

2010/0271036 A1* 10/2010 Kishimoto .......... B60L 11/1855
                                             324/434
2012/0249075 A1* 10/2012 Hori .................... H01M 10/052
                                             320/118

FOREIGN PATENT DOCUMENTS

| | | |
|---|---|---|
| CN | 101872880 A | 10/2010 |
| EP | 2244319 A1 | 10/2010 |
| JP | 2011-134578 A | 7/2011 |
| JP | 2013-143272 A | 7/2013 |
| JP | 2014014265 A | 1/2014 |
| WO | 2012011237 A1 | 1/2012 |

\* cited by examiner

*Primary Examiner* — Patrick Ryan
*Assistant Examiner* — Christopher Domone
(74) *Attorney, Agent, or Firm* — Andrews Kurth Kenyon LLP

(57) ABSTRACT

A bus bar module includes bus bars and block circuits. A voltage detection circuit included in each block circuit detects voltage values of electric storage elements via lines connected to the respective bus bars. The number of the electric storage elements assigned to a first block circuit is an even number equal to or larger than a minimum number and smaller than a maximum number. The number of the electric storage elements assigned to a second block circuit is equal to or larger than the minimum number and smaller than the maximum number. The number of the electric storage elements assigned to each third block circuit is the maximum number.

4 Claims, 6 Drawing Sheets

BUS BAR MODULE

INCORPORATION BY REFERENCE

The disclosure of Japanese Patent Application No. 2014-033716 filed on Feb. 25, 2014 including the specification, drawings and abstract is incorporated herein by reference in its entirety.

BACKGROUND OF THE INVENTION

1. Field of the Invention

The invention relates to a bus bar module that electrically connects a plurality of electric storage elements in series.

2. Description of Related Art

Japanese Patent Application Publication No. 2013-143272 describes a cell module including a cell assembly and a bus bar module. The bus bar module includes bus bars each of which connects two unit cells adjacent to each other, cell monitoring integrated circuits that monitor the states (the voltage values) of the unit cells, and terminals that connect the bus bars to the cell monitoring integrated circuits. In this case, the bus bar module includes the plurality of cell monitoring integrated circuits.

When the plurality of cell monitoring integrated circuits are used as in Japanese Patent Application Publication No. 2013-143272, it is preferable to reduce the total number of the cell monitoring integrated circuits as much as possible, in order to, for example, reduce the cost. The number (the maximum number) of the unit cells whose voltage values can be monitored by one cell monitoring integrated circuit has been set. Accordingly, the total number of the cell monitoring integrated circuits can be reduced by assigning the maximum number of the unit cells to one cell monitoring integrated circuit.

When the total number of the unit cells constituting the cell assembly is divided by the maximum number, the total number of the unit cells may not be divisible (a remainder may be left), depending on the total number. In this case, there are one or more remaining unit cells, the number of which corresponds to the remainder and is smaller than the maximum number. When the cell monitoring integrated circuit is operated by electric power supplied from the plurality of unit cells assigned to the cell monitoring integrated circuit, it may not be possible to ensure the voltage value for operating the cell monitoring integrated circuit using the total voltage value of the remaining unit cells.

SUMMARY OF THE INVENTION

An aspect of the invention relates to a bus bar module fitted to an electric storage device. The electric storage device includes a plurality of electric storage elements arranged in a predetermined direction. The electric storage elements are arranged such that positive electrode terminals and negative electrode terminals are alternately disposed in the predetermined direction. The bus bar module according to the aspect of the invention includes a plurality of bus bars and a plurality of block circuits. The bus bars are connected to the positive electrode terminals and the negative electrode terminals of the electric storage elements.

A plurality of the electric storage elements connected to each other in series are assigned to each of the block circuits, and the number of the electric storage elements assigned to each of the block circuits is smaller than a total number of the electric storage elements included in the electric storage device. Each of the block circuits includes a voltage detection circuit that detects voltage values of the electric storage elements assigned to the block circuit via lines that are connected to the respective bus bars. The voltage detection circuit is operated by electric power supplied from the electric storage elements assigned to a corresponding one of the block circuits.

In the electric storage device in the above-described aspect of the invention, a remainder, which is obtained by dividing the total number of the electric storage elements included in the electric storage device by a maximum number of the electric storage elements whose voltage values are able to be detected by the voltage detection circuit, is smaller than a minimum number of the electric storage elements required to ensure a minimum voltage value for operating the voltage detection circuit. The block circuits include a first block circuit, a second block circuit, and a plurality of third block circuits.

The electric storage elements assigned to the first block circuit include the electric storage element that exhibits a lowest potential in the electric storage device. The number of the electric storage elements assigned to the first block circuit is an even number equal to or larger than the minimum number and smaller than the maximum number. The electric storage elements assigned to the second block circuit include the electric storage element that exhibits a highest potential in the electric storage device. The number of the electric storage elements assigned to the second block circuit is equal to or larger than the minimum number and smaller than the maximum number. The number of the electric storage elements assigned to each of the third block circuits is the maximum number.

According to the above-described aspect of the invention, the number of the electric storage elements assigned to each of the third block circuits is the maximum number, and therefore, the number of the voltage detection circuits included in the bus bar module, in other words, the number of the block circuits can be reduced. Further, the number of the electric storage elements assigned to each of the block circuits is equal to or larger than the minimum number, and therefore, it is possible to ensure the voltage value for operating the voltage detection circuit in each of the block circuits using the electric storage elements assigned to the block circuit.

When the bus bar module is fitted to the electric storage device, the bus bar module is fitted in order from a low potential side of the electric storage device. Accordingly, the block circuits are fitted to the electric storage device in order of the first block circuit, the third block circuits, and the second block circuit. In the electric storage device, the positive electrode terminals and the negative electrode terminals of the electric storage elements are alternately disposed in the predetermined direction.

By setting the number of the electric storage elements assigned to each of the third block circuits to an even number, the voltage values of the electric storage elements can be detected by the voltage detection circuit included in each of the third block circuits, when the third block circuits are arranged. If the number of the electric storage elements assigned to each of the third block circuits is set to an odd number, there is the electric storage element whose voltage value cannot be detected simply by using the plurality of third block circuits having the same configuration.

Since the first block circuit is disposed adjacent to the third block circuit, the number of the electric storage elements assigned to the first block circuit needs to be an even number. If the number of the electric storage elements assigned to the first block circuit is set to an odd number, there is the electric storage element whose voltage value cannot be detected, among the electric storage elements assigned to the first block circuit and the third block circuit.

The number of the electric storage elements assigned to the first block circuit is an even number and the number of the electric storage elements assigned to each of the third block circuits is an even number. Therefore, a pattern of the lines included in the first block circuit may be same as a part of a pattern of the lines included in each of the third block circuits. Thus, when the third block circuits are prepared, a part of the third block circuit can be used as the first block circuit. Accordingly, it is not necessary to prepare the first block circuit and the third block circuits separately.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described.

Figure 1:
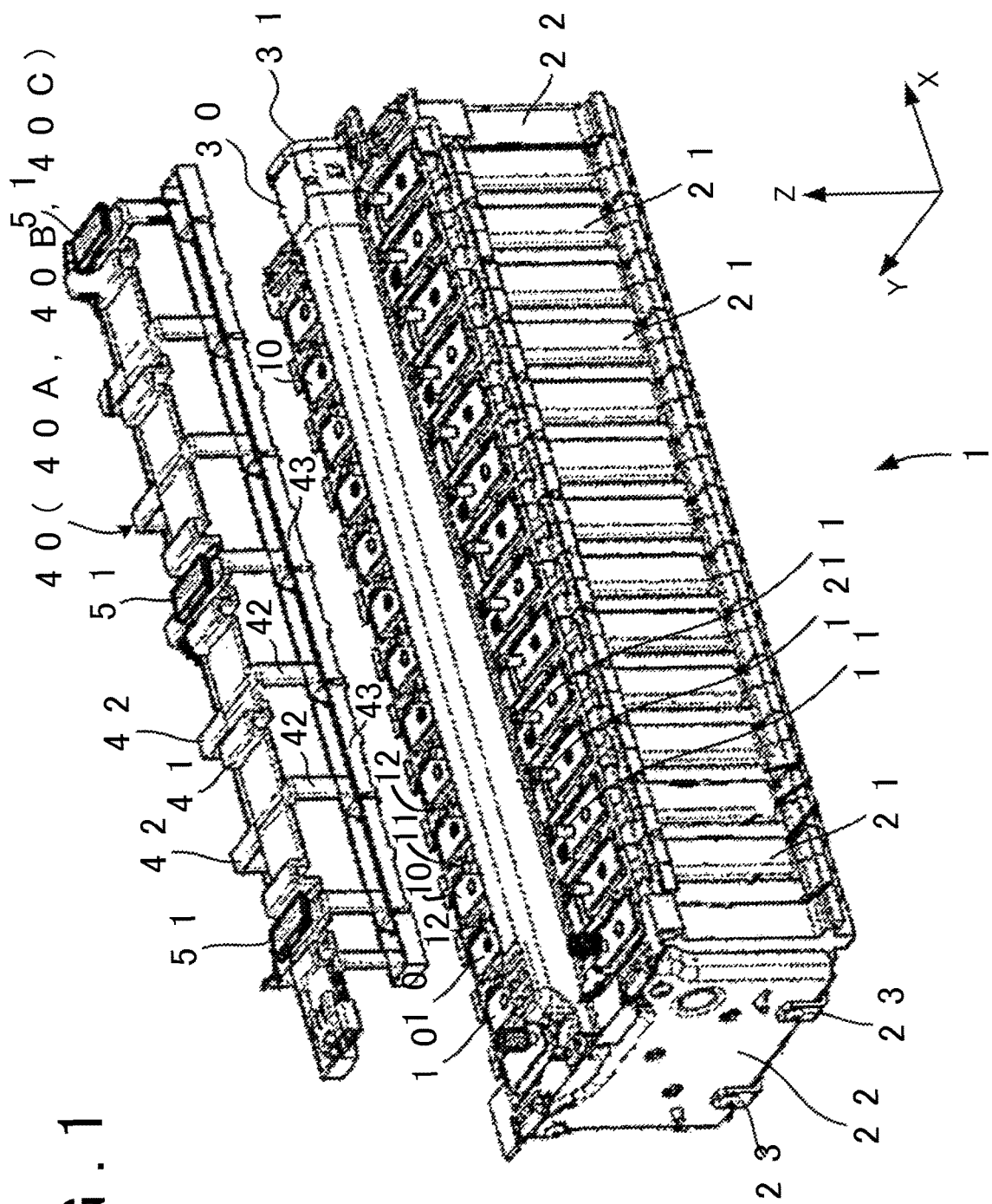
FIG. 1 is an external view illustrating a schematic configuration of a cell stack according to an embodiment of the invention.

FIG. 1 is an external view illustrating a schematic configuration of a cell stack 1 (that may be regarded as an electric storage device according to the invention). In FIG. 1, an X-axis, a Y-axis, and a Z-axis are orthogonal to each other. In the embodiment, the Z-axis extends in a vertical direction. The relation among the X-axis, the Y-axis, and the Z-axis in each of the other figures is the same as that in FIG. 1.

The cell stack 1 includes a plurality of unit cells 10 (that may be regarded as electric storage elements according to the invention). For example, the cell stack 1 may be installed in a vehicle, and may be used as a driving power source for driving the vehicle. As the unit cell 10, a secondary cell, such as a nickel hydride cell and a lithium-ion cell, may be used. Instead of the secondary cell, an electric double-layer capacitor may be used.

The unit cell 10 is a so-called prismatic cell, and the outer shape of the unit cell 10 is a rectangular parallelepiped shape. A positive electrode terminal 11 and a negative electrode terminal 12 are provided on an upper surface of each of the unit cells 10. The positive electrode terminal 11 and the negative electrode terminal 12 are connected to a power generation element (not shown) housed inside the unit cell 10. The power generation element is an element which is charged with electricity, and from which electricity is discharged. As is known, the power generation element includes a positive electrode plate, a negative electrode plate, and a separator disposed between the positive electrode plate and the negative electrode plate. The positive electrode plate of the power generation element is electrically connected to the positive electrode terminal 11, and the negative electrode plate of the power generation element is electrically connected to the negative electrode terminal 12. Instead of the separator, a solid electrolyte may be used.

A valve (not shown) is provided on an upper surface of the unit cell 10. When gas is generated inside the unit cell 10 (i.e., in a space in which the power generation element is housed), the pressure inside the unit cell 10 increases. When the pressure inside the unit cell 10 becomes higher than the pressure at which the valve is operated, the state of the valve is changed from the closed state to the opened state. Thus, gas can be discharged from the inside of the unit cell 10 to the outside of the unit cell 10.

The plurality of unit cells 10 are arranged in an X direction (that may be regarded as a predetermined direction according to the invention). The unit cells 10 are disposed in the X direction such that the positive electrode terminals 11, and the negative electrode terminals 12 are alternately disposed. All the unit cells 10 constituting the cell stack 1 are connected in series by bus bars. As described later, with regard to two unit cells 10 adjacent to each other in the X direction, the bus bar is connected to the positive electrode terminal 11 of one unit cell 10 and the negative electrode terminal 12 of the other unit cell 10.

The positive electrode terminal 11 of the unit cell 10 disposed at one end of the cell stack 1 in the X direction is used as a positive electrode terminal of the cell stack 1. Since the plurality of unit cells 10 constituting the cell stack 1 are electrically connected in series, the unit cell 10, which includes the positive electrode terminal 11 used as the positive electrode terminal of the cell stack 1, is the unit cell 10 that exhibits the highest potential in the cell stack 1.

The negative electrode terminal 12 of the unit cell 10 disposed at the other end of the cell stack 1 in the X direction is used as the negative electrode terminal of the cell stack 1. Since the plurality of unit cells 10 constituting the cell stack 1 are electrically connected in series, the unit cell 10, which includes the negative electrode terminal 12 used as the negative electrode terminal of the cell stack 1, is the unit cell 10 that exhibits the lowest potential in the cell stack 1.

The positive electrode terminals and the negative electrode terminals in the cell stack 1 are connected to a load via a cable (not shown). Thus, it is possible to perform charging and discharging of the cell stack 1 (all the unit cells 10).

A spacer 21 is disposed between the two unit cells 10 adjacent to each other in the X direction. The spacer 21 is used to define a space among the unit cells 10 and the spacer 21. This space serves as a passage through which air for adjusting the temperature of the unit cell 10 flows.

Paired end plates 22 are disposed at respective ends of the cell stack 1 in the X direction. Binding bands 23 extend in the X direction, and ends of each of the binding bands 23 are fixed to the end plates 22, respectively. FIG. 1 shows only the binding bands 23 disposed at the bottom surface of the cell stack 1. However, the binding bands 23 are also disposed at the upper surface of the cell stack 1.

Since the ends of each of the binding bands 23 in the X direction are fixed to the end plates 22, respectively, a binding force can be applied to the unit cells 10 and the spacers 21 disposed between the end plates 22. The binding force is a force for holding (supporting) the unit cells 10 and the spacers 21 in the X direction. The end plates 22 and the binding bands 23 may be omitted, and the binding force may not be applied to the unit cells 10 and the spacers 21.

A duct 30 extending in the X direction is disposed on the upper surface of the cell stack 1. The duct 30 is disposed above the valve of each unit cell 10, and the gas discharged from the valve flows into the duct 30. Then, the gas flows along the duct 30 in the X direction. Another duct is connected to a connection port 31 of the duct 30. Since the duct 30 and the other duct are used, the gas discharged from the valve of each unit cell 10 flows in a direction away from the cell stack 1. For example, when the cell stack 1 is installed in a vehicle, the gas can be discharged to the outside of the vehicle.

A bus bar module 40 is disposed on the upper surface of the cell stack 1. The bus bar module 40 includes three kinds of bus bar blocks (a first bus bar block 40A, a second bus bar block 40B, and third bus blocks 40C). One bus bar module 40 is formed by connecting the three kinds of bus bar blocks 40A, 40B, 40C. Each of the bus bar blocks 40A, 40B, 40C is formed by an insulating material such as resin, and includes a main body portion 41, leg portions 42, and retaining portions 43. The main body portion 41, the leg portions 42, and the retaining portions 43 are integrally formed.

The main body portions 41 are disposed above the duct 30, and voltage detection circuits 51 are fitted to the upper surfaces of the main body portions 41. The voltage detection circuits 51 are used to detect voltage values of the unit cells 10. The result of detection performed by each voltage detection circuit 51 is transmitted to an Electric Control Unit (ECU) disposed outside the cell stack 1. The leg portions 42 extend downward from the main body portion 41. The paired leg portions 42 are disposed on respective sides of the duct 30 in the Y direction. One end of each leg portion 42 is connected to the main body portion 41, and the other end of the leg portion 42 is connected to the retaining portion 43.

The retaining portion 43 retains the bus bars to be described later. More specifically, the bus bars are disposed inside the retaining portion 43. Each retaining portion 43 extends in the X direction, and is located at or above the positions of the positive electrode terminals 11 and the negative electrode terminals 12. The positive electrode terminals 11 and the negative electrode terminals 12 extend through the retaining portion 43, and are connected to the bus bars disposed inside the retaining portion 43. A thread groove is provided on an outer surface of each of the positive electrode terminals 11 and the negative electrode terminals 12. By fastening a nut to the thread groove on the outer surface of each of the positive electrode terminals 11 and the negative electrode terminals 12, the positive electrode terminals 11 and the negative electrode terminals 12 can be connected to the bus bars.

Figure 2:
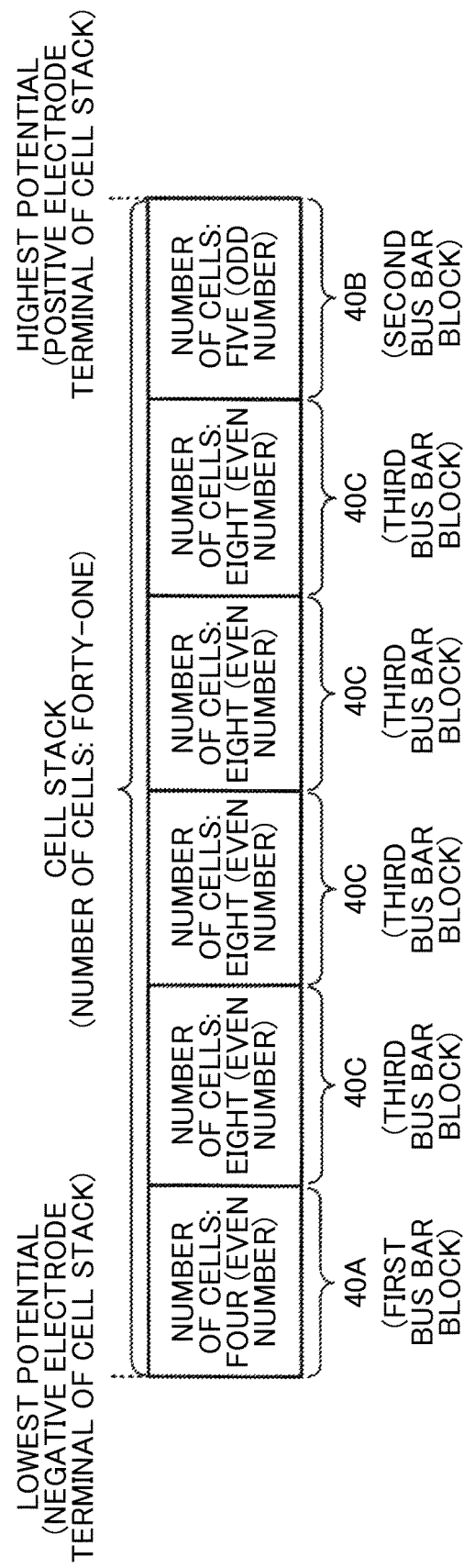
FIG. 2 is a view showing the number of unit cells assigned to each bus bar block in the embodiment of the invention.

FIG. 2 shows (an example of) the number of the unit cells 10 assigned to each of the bus bar blocks 40A, 40B, 40C. In the example shown in FIG. 2, the cell stack 1 is formed by the forty-one unit cells 10. In FIG. 2, the lowest potential signifies the potential at the negative electrode terminal of the cell stack 1, and the highest potential signifies the potential at the positive electrode terminal of the cell stack 1.

The first bus bar block 40A and the second bus bar block 40B are disposed at the respective ends of the cell stack 1 in the X direction, in other words, the respective ends of the bus bar module 40 in the X direction. The four third bus bar blocks 40C are disposed between the first bus bar block 40A and the second bus bar block 40B. The two bus bar blocks adjacent to each other in the X direction are connected to each other. More specifically, the first bus bar block 40A and the third bus bar block 40C are connected to each other, the second bus bar block 40B and the third bus bar block 40C are connected to each other, and the two third bus bar blocks 40C are connected to each other.

The four unit cells 10 (an even number of unit cells 10) arranged in the X direction are assigned to the first bus bar block 40A, the five unit cells 10 (an odd number of unit cells 10) arranged in the X direction are assigned to the second bus bar block 40B. The eight unit cells 10 (an even number of unit cells 10) arranged in the X direction are assigned to each third bus bar block 40C. The unit cells 10 assigned to each of the bus bar blocks 40A, 40B, 40C are electrically connected in series.

The number Nc of the unit cells 10 assigned to each third bus bar block 40C is the maximum number Nmax (eight in the example shown in FIG. 2) of the unit cells 10 whose voltage values can be detected by the voltage detection circuit 51 fitted to the third bus bar block 40C. The number Na of the unit cells 10 assigned to the first bus bar block 40A, and the number Nb of the unit cells 10 assigned to the second bus bar block 40B are smaller than the above-described number Nc (i.e., the maximum number Nmax).

Each of the number Na and the number Nb is set such that the voltage value for operating the voltage detection circuit 51 is ensured (the voltage for operating the voltage detection circuit 51 is provided). Since the number Nc is larger than the number Na and the number Nb, the voltage value for operating the voltage detection circuit 51 can be ensured using the number Nc of the unit cells 10, when the voltage value for operating the voltage detection circuit 51 is ensured using the number Na of the unit cells 10 or the number Nb of the unit cells 10.

The voltage detection circuits 51 fitted to the bus bar blocks 40A, 40B, 40C are operated by electric power supplied from the unit cells 10. Therefore, the value of the voltage supplied to the voltage detection circuit 51 needs to be equal to or larger than a minimum operating voltage value Vd that is a minimum voltage value required to operate the voltage detection circuit 51. A voltage value Vb of the unit cell 10 may be smaller than the minimum operating voltage value Vd. Therefore, it is necessary to ensure the minimum operating voltage value Vd using the plurality of unit cells 10 connected in series.

The voltage value Vb of the unit cell 10 changes in accordance with charging and discharging of the cell stack 1. Therefore, the number of the unit cells 10 required to ensure the minimum operating voltage value Vd may be set taking into account a minimum voltage value Vb_min of the unit cell 10. The minimum voltage value Vb_min is the minimum value of the voltage value Vb when charging and discharging of the cell stack 1 are controlled.

The value obtained by dividing the minimum operating voltage value Vd by the minimum voltage value Vb_min is a minimum number Nmin of the unit cells 10 required to ensure the minimum operating voltage value Vd. Accordingly, each of the numbers Na, Nb needs to be equal to or larger than the minimum number Nmin. In the example shown in FIG. 2, the number of the unit cells 10 assigned to the bus bar block 40A (i.e., four), and the number of the unit cells 10 assigned to the bus bar block 40B (i.e., five) are equal to or larger than the minimum number Nmin.

Figure 3:
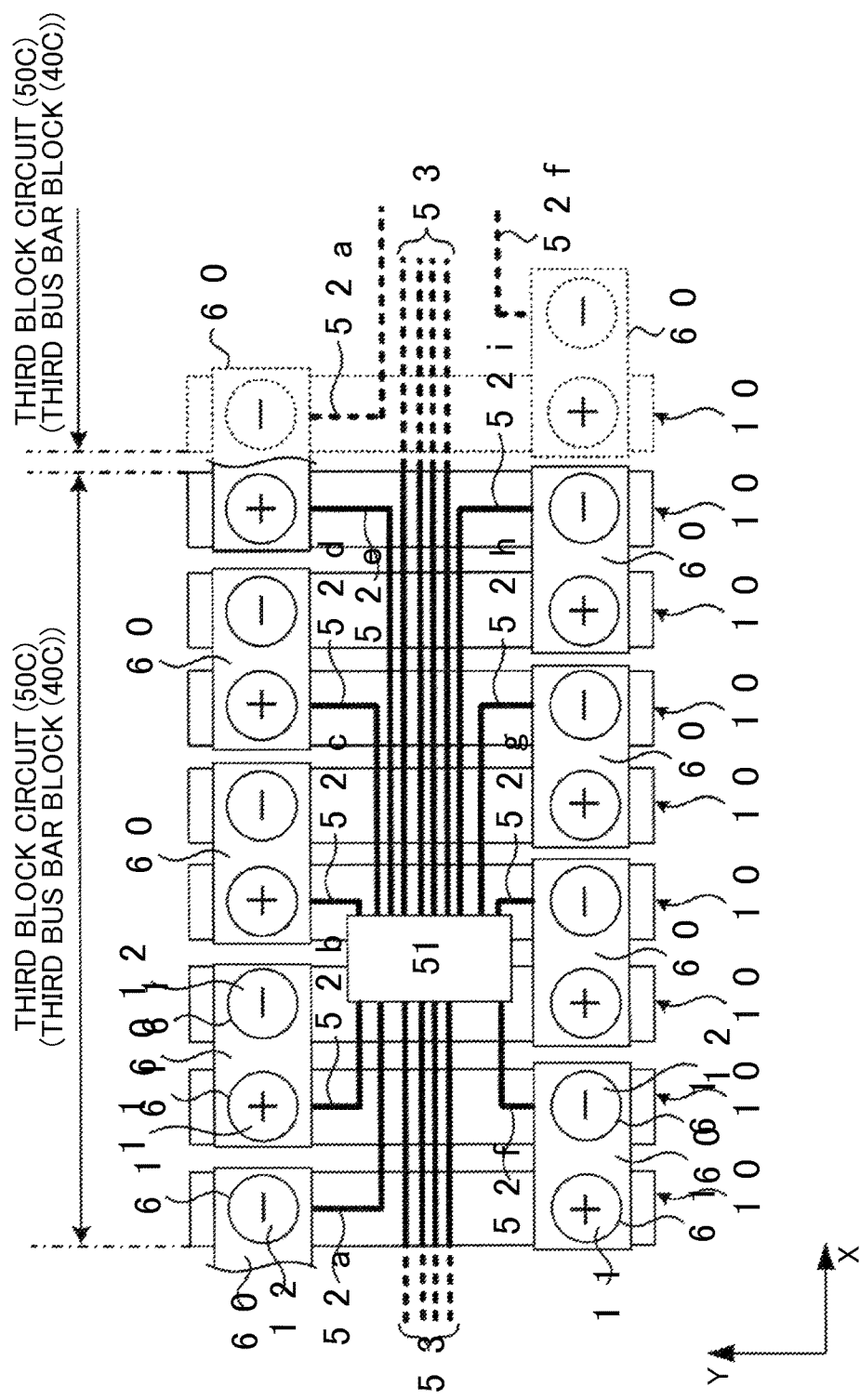
FIG. 3 is a view showing a configuration of a third block circuit included in a third bus bar block when the number of the unit cells assigned to the third bus bar block is an even number, in the embodiment of the invention.

FIG. 3 shows a configuration of a third block circuit 50C included in the third bus bar block 40C. The third block circuit 50C includes the voltage detection circuit 51 and lines 52a to 52i. The lines 52a to 52i are disposed in the leg portions 42 and the retaining portions 43 of the third bus bar block 40C. The lines 52a to 52i may be disposed on the surface of the third bus bar block 40C, or may be embedded inside the third bus bar block 40C.

One end of each of the lines 52a to 52i is connected to the voltage detection circuit 51, and the other end of each of the lines 52a to 52i is in contact with a bus bar 60. When the bus bars 60 are disposed in the retaining portions 43 of the third bus bar block 40C, the other ends of the lines 52a to 52i are in contact with the bus bars 60.

Each of the lines 52a to 52i is in contact with a corresponding one of the bus bars 60 in the area of the third block circuit 50C. As shown in FIG. 3, when the two third block circuits 50C are arranged adjacent to each other, the line included in one of the third block circuits 50C, and the line included in the other of the third block circuits 50C are in contact with one bus bar 60. In the example shown in FIG. 3, the lines 52a, 52e are in contact with one bus bar 60.

Communication lines 53 are connected to the voltage detection circuit 51. The communication lines 53 are used to transmit the result of detection performed by the voltage detection circuit 51 to the above-described ECU.

Two through-holes 61 are provided in each bus bar 60. The positive electrode terminal 11 extends through one of the through-holes 61, and the negative electrode terminal 12 extends through the other of the through-holes 61. The lines 52a to 52i are electrically connected to the positive electrode terminals 11 and the negative electrode terminals 12 via the bus bars 60. Therefore, the voltage detection circuit 51 can detect the voltage value of each unit cell 10 via the two lines (the two lines among the lines 52a to 52i) that are electrically connected to the positive electrode terminal 11 and the negative electrode terminal 12 of the unit cell 10.

In the embodiment, the number of the unit cells 10 assigned to each third bus bar block 40C (each third block circuit 50C) is set to an even number. Thus, the voltage values of the unit cells 10 included in the cell stack 1 can be detected using the plurality of third bus bar blocks 40C (the third block circuits 50C). When the plurality of third bus bar blocks 40C are arranged as shown in FIG. 2, the two third block circuits 50C are arranged as shown in FIG. 3. As apparent from FIG. 3, the voltage values of the unit cells 10 can be detected simply by arranging the plurality of third block circuits 50C.

Figure 4:
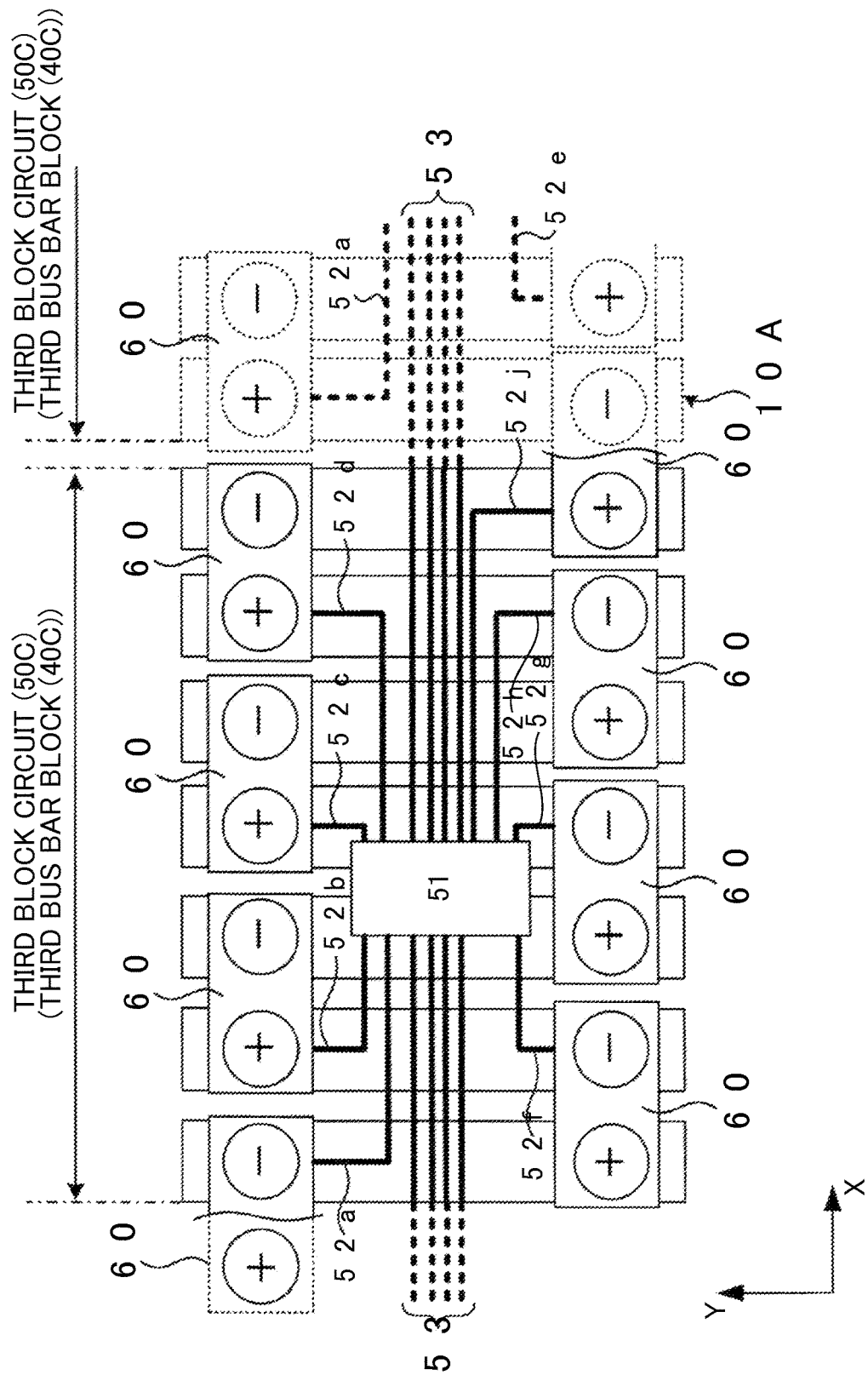
FIG. 4 is a view showing a configuration of the third block circuit included in the third bus bar block when the number of the unit cells assigned to the third bus bar block is an odd number, in the embodiment of the invention.

If the number of the unit cells 10 assigned to each third bus bar block 40C (each third block circuit 50C) is set to an odd number, lines 52a to 52d, 52f to 52h, and 52j need to be provided in the third block circuit 50C as shown in FIG. 4. In FIG. 4, lines in the same pattern as the pattern of the lines among the lines 52a to 52h shown in FIG. 3 are denoted by the same reference numerals and signs.

If the third block circuits 50C are arranged as shown in FIG. 4, it is not possible to detect the voltage value of a unit cell 10A shown in FIG. 4. The negative electrode terminal 12 of the unit cell 10A is connected to the voltage detection circuit 51 of one of the third block circuits 50C via the line 52j, and the positive electrode terminal 11 of the unit cell 10A is connected to the voltage detection circuit 51 of the other of the third block circuits 50C via the line 52a. Since the positive electrode terminal 11 and the negative electrode terminal 12 of the unit cell 10A are not connected to the same voltage detection circuit 51, it is not possible to detect the voltage value of the unit cell 10A.

When the patterns of the lines are changed in the block circuits disposed adjacent to each other, it is possible to detect the voltage value of the unit cell 10A. In this case, the number of kinds of the block circuits increases. Thus, unlike in the embodiment, it is not possible to use the plurality of third block circuits 50C having the same configuration.

Thus, when the plurality of third block circuits 50C having the same configuration are used, the number of the unit cells 10 assigned to each third bus bar block 40C (each third block circuit 50C) needs to be set to an even number. By using the plurality of third block circuits 50C having the same configuration, it is possible to prevent an increase in the number of the kinds of the block circuits. If the number of the kinds of the block circuits increases, the operation of connecting the block circuits to the unit cells 10 is complicated, and therefore, there is a possibility that the block circuits may be incorrectly connected to the unit cells 10.

Figure 5:
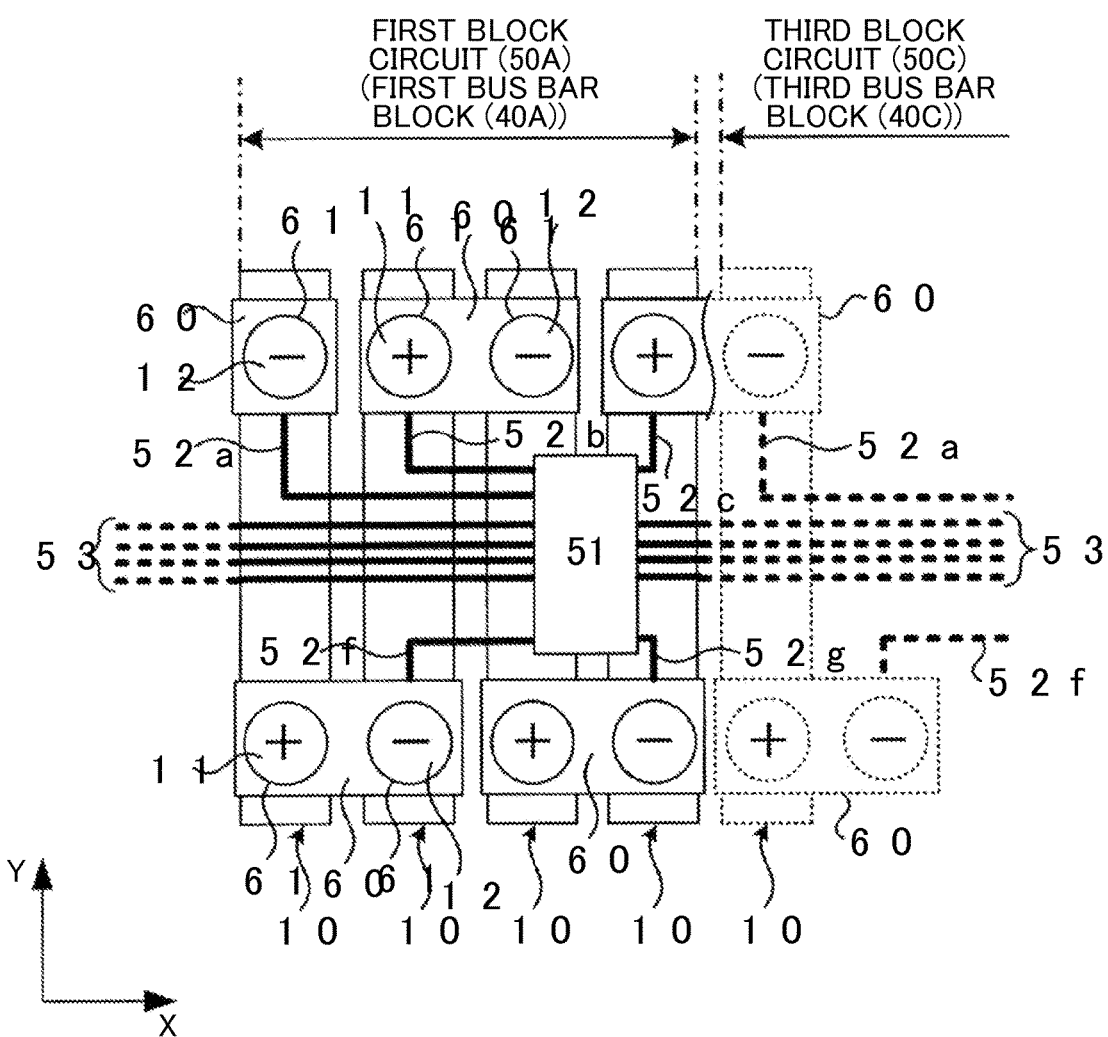
FIG. 5 is a view showing a configuration of a first block circuit included in a first bus bar block, in the embodiment of the invention.

FIG. 5 shows a configuration of a first block circuit 50A included in the first bus bar block 40A. The first block circuit 50A includes the voltage detection circuit 51 and the lines 52a to 52c, 52f, and 52g. The lines 52a to 52c, 52f, and 52g are disposed in the leg portions 42 and the retaining portions 43 of the first bus bar block 40A. The lines 52a to 52c, 52f, and 52g may be disposed on the surface of the first bus bar block 40A, or may be embedded inside the first bus bar block 40A.

Each of the lines 52a to 52c, 52f, and 52g is in contact with a corresponding one of the bus bars 60 in the area of the first block circuit 50A. As shown in FIG. 5, the third block circuit 50C is disposed adjacent to the first block circuit 50A. When the first block circuit 50A and the third block circuit 50C are arranged, the line included in the first block circuit 50A and the line included in the third block circuit 50C are in contact with one bus bar 60. In the example shown in FIG. 5, the lines 52c and 52a are in contact with one bus bar 60.

A part of the third block circuit 50C is used as the first block circuit 50A. Therefore, in the first block circuit 50A, the lines that are the same as the lines 52a to 52i in the third block circuit 50C are denoted by the same reference numerals and signs. In the embodiment, when the third bus bar blocks 40C (the third block circuits 50C) are manufactured, a part of the third bus bar block 40C can be used as the first bus bar block 40A (the first block circuit 50A), and therefore, it is not necessary to separately manufacture the first bus bar block 40A.

The pattern of the lines in the first block circuit 50A may be different from the pattern of the lines in the third block circuit 50C, as long as the voltage value of each of the unit cells 10 assigned to the first block circuit 50A can be detected using the plurality of lines in the first block circuit 50A.

In the first block circuit 50A shown in FIG. 5, the voltage detection circuit 51 can detect the voltage value of each unit cell 10 via the two lines (the two lines among the lines 52a to 52c, 52f, and 52g) that are electrically connected to the positive electrode terminal 11 and the negative electrode terminal 12 of the unit cell 10. The result of detection performed by the voltage detection circuit 51 is transmitted to the ECU via the communication lines 53. The bus bar 60 connected to the line 52a is connected to only the negative electrode terminal 12 of the unit cell 10. This negative electrode terminal 12 serves as the negative electrode terminal of the cell stack 1 as described above.

The number of the unit cells 10 assigned to the first bus bar block 40A is an even number equal to or larger than the minimum number Nmin and smaller than the maximum number Nmax. The first block circuit 50A is connected to the unit cell 10 that exhibits the lowest potential in the cell stack 1. The third bus bar block 40C is disposed adjacent to the first bus bar block 40A. If the number of the unit cells 10 assigned to the first bus bar block 40A is set to an odd number, there is the unit cell 10 whose voltage value cannot be detected as in the example shown in FIG. 4. Accordingly, the number of the unit cells 10 assigned to the first bus bar block 40A needs to be set to an even number.

Figure 6:
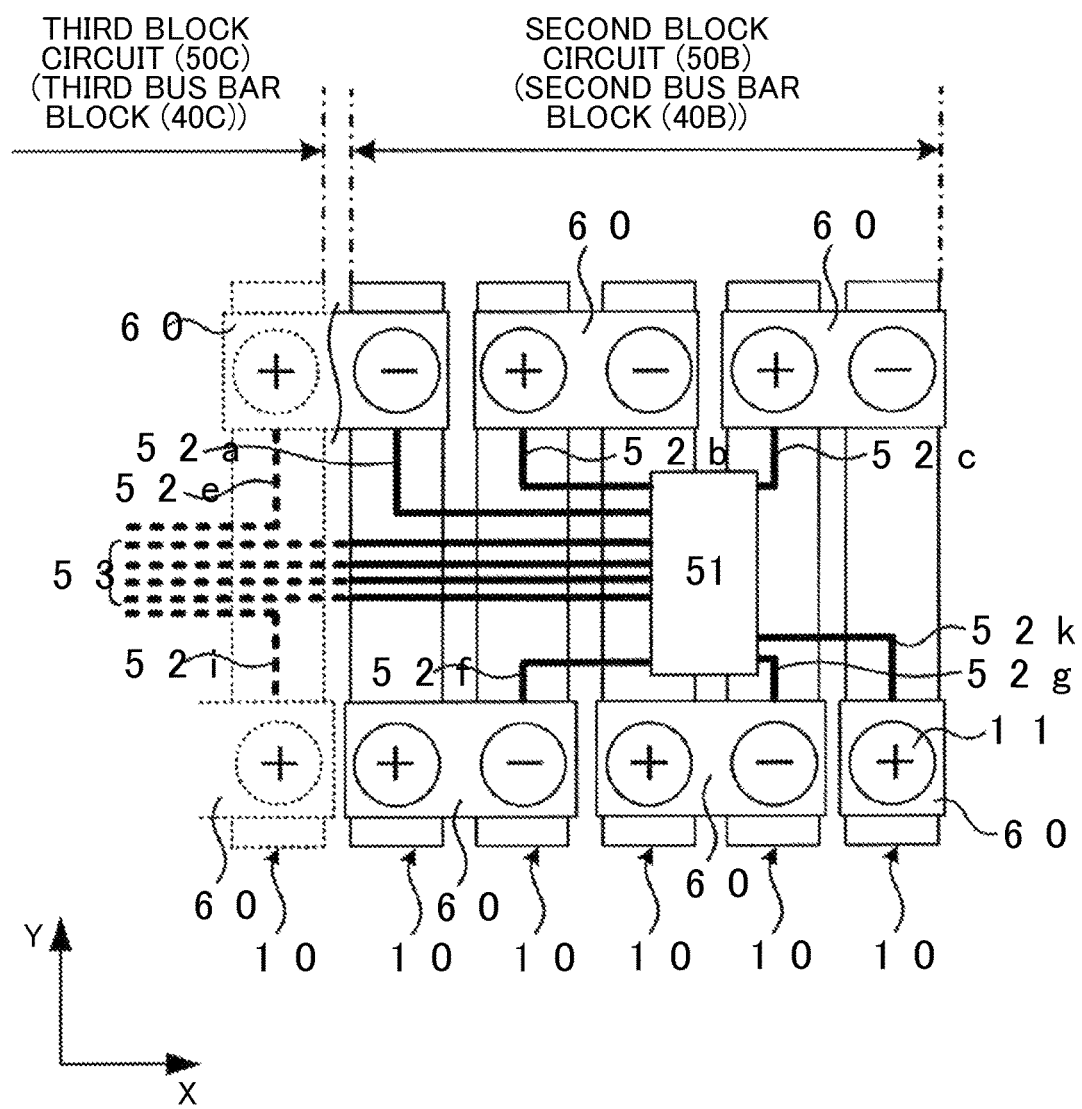
FIG. 6 is a view showing a configuration of a second block circuit included in a second bus bar block.

FIG. 6 shows a configuration of a second block circuit 50B included in the second bus bar block 40B. The second block circuit 50B includes the voltage detection circuit 51 and the lines 52a to 52c, 52f, 52g, and 52k. In FIG. 6, lines in the same pattern as the pattern of the lines among the lines 52a to 52h included in the third block circuit 50C are denoted by the same reference numerals and signs. In the second block circuit 50B, the additional line 52k is provided.

Each of the lines 52a to 52c, 52f, 52g, and 52k is in contact with a corresponding one of the bus bars 60 in the area of the second block circuit 50B. As shown in FIG. 6, the third block circuit 50C is disposed adjacent to the second block circuit 50B. When the second block circuit 50B and the third block circuit 50C are arranged, the line included in the second block circuit 50B and the line included in the third block circuit 50C are in contact with one bus bar 60. In the example shown in FIG. 6, the lines 52a, 52e are in contact with one bus bar 60.

In the second block circuit 50B shown in FIG. 6, the voltage detection circuit 51 can detect the voltage value of each unit cell 10 via the two lines (the two lines among the lines 52a to 52c, 52f, 52g, and 52k) that are electrically connected to the positive electrode terminal 11 and the negative electrode terminal 12 of the unit cell 10. The result of detection performed by the voltage detection circuit 51 is transmitted to the ECU via the communication lines 53. The bus bar 60 connected to the line 52k is connected to only the positive electrode terminal 11 of the unit cell 10. This positive electrode terminal 11 serves as the positive electrode terminal of the cell stack 1, as described above.

The embodiment is applied to the cell stack 1 configured such that the remainder obtained by dividing the total number Ns of the unit cells 10 constituting the cell stack 1 by the maximum number Nmax is smaller than the minimum number Nmin. In the cell stack 1 having the above-described configuration, the number of the unit cells 10 assigned to each third bus bar block 40C (each third block circuit 50C) is the maximum number Nmax. Therefore, it is possible to suppress an increase in the number of the bus bar blocks 40A, 40B, 40C constituting the bus bar module 40. Further, since the number of the unit cells 10 assigned to each of the bus bar blocks 40A to 40C (each of the block circuits 50A to 50C) is equal to or larger than the minimum number Nmin, it is possible to ensure the operating voltage for operating the voltage detection circuit 51.

In the embodiment, the number of the unit cells 10 assigned to the second bus bar block 40B (the second block circuit 50B) is an odd number. However, the number of the unit cells 10 assigned to the second bus bar block 40B (the second block circuit 50B) may be an even number. For example, when the total number Ns of the unit cells 10 is forty-two, the four unit cells 10 (an even number of the unit cells 10) can be assigned to the first bus bar block 40A as in the example shown in FIG. 2. On the other hand, the six unit cells 10 (an even number of the unit cells 10) can be assigned to the second bus bar block 40B. In this case, the maximum number Nmax of the unit cells 10 (eight unit cells 10) are assigned to the third bus bar block 40C.

What is claimed is:

1. A bus bar module fitted to an electric storage device in which a plurality of electric storage elements are arranged in a predetermined direction such that positive electrode terminals and negative electrode terminals are alternately disposed in the predetermined direction, the bus bar module comprising:

a plurality of bus bars connected to the positive electrode terminals and the negative electrode terminals of the electric storage elements; and a plurality of block circuits, wherein: a plurality of the electric storage elements connected to each other in series are assigned to each of the block circuits, and the number of the electric storage elements assigned to each of the block circuits is smaller than a total number of the electric storage elements included in the electric storage device;

each of the block circuits includes a voltage detection circuit that detects voltage values of the electric storage elements assigned to the block circuit via lines that are connected to the respective bus bars;

the voltage detection circuit is operated by electric power supplied from the electric storage elements assigned to a corresponding one of the block circuits, the voltage detection circuit is adapted to be connected to a maximum number of the electric storage elements whose voltage values are able to be detected by the voltage detection circuit;

the total number of the electric storage elements included in the electric storage device divided by the maximum number of the electric storage elements for the voltage detection circuit results in a remainder whose value is smaller than a minimum number of the electric storage elements required to ensure a minimum voltage value for operating the voltage detection circuit;

the block circuits include a first block circuit, a second block circuit, and a plurality of third block circuits;

the electric storage elements assigned to the first block circuit include the electric storage element that exhibits a lowest potential in the electric storage device, and the number of the electric storage elements assigned to the first block circuit is an even number equal to or larger than the minimum number and smaller than the maximum number;

the electric storage elements assigned to the second block circuit include the electric storage element that exhibits a highest potential in the electric storage device, and the number of the electric storage elements assigned to the second block circuit is equal to or larger than the minimum number and smaller than the maximum number; and the number of the electric storage elements assigned to each of the third block circuits is the maximum number.

2. The bus bar module according to claim 1, wherein the number of the electric storage elements assigned to each of the third block circuits is an even number.

3. The bus bar module according to claim 1, wherein a pattern of the lines included in the first block circuit is same as a part of a pattern of the lines included in each of the third block circuits.

4. The bus bar module according to claim 1, wherein the number of the electric storage elements assigned to the second block circuit is an odd number.

* * * * *